March 23, 1948.　　J. M. J. RIBOUD　　2,438,414
TRACTION REDUCER
Filed March 1, 1944　　4 Sheets-Sheet 1
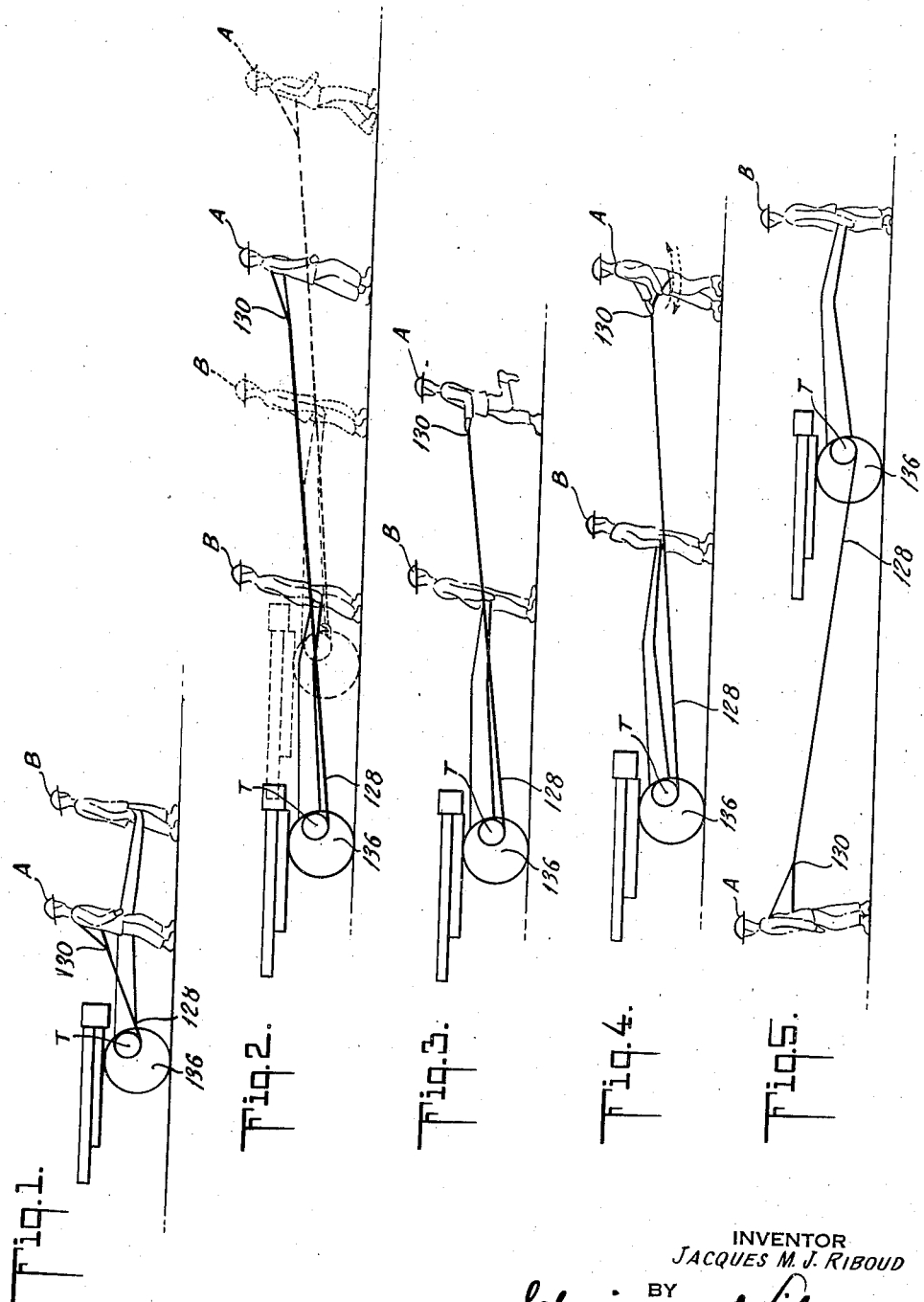
INVENTOR
JACQUES M. J. RIBOUD
BY
Schainer and Liberman
ATTORNEYS

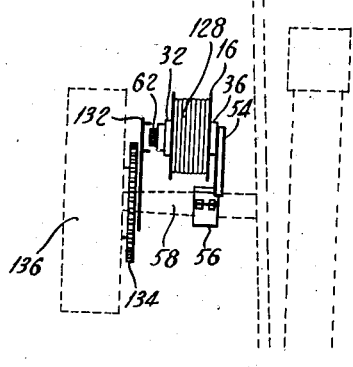
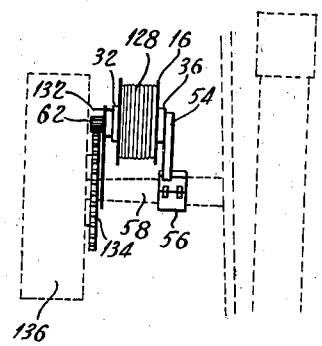
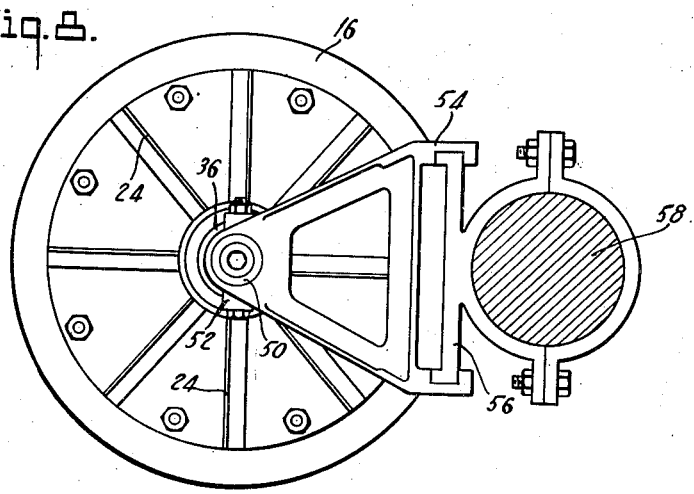

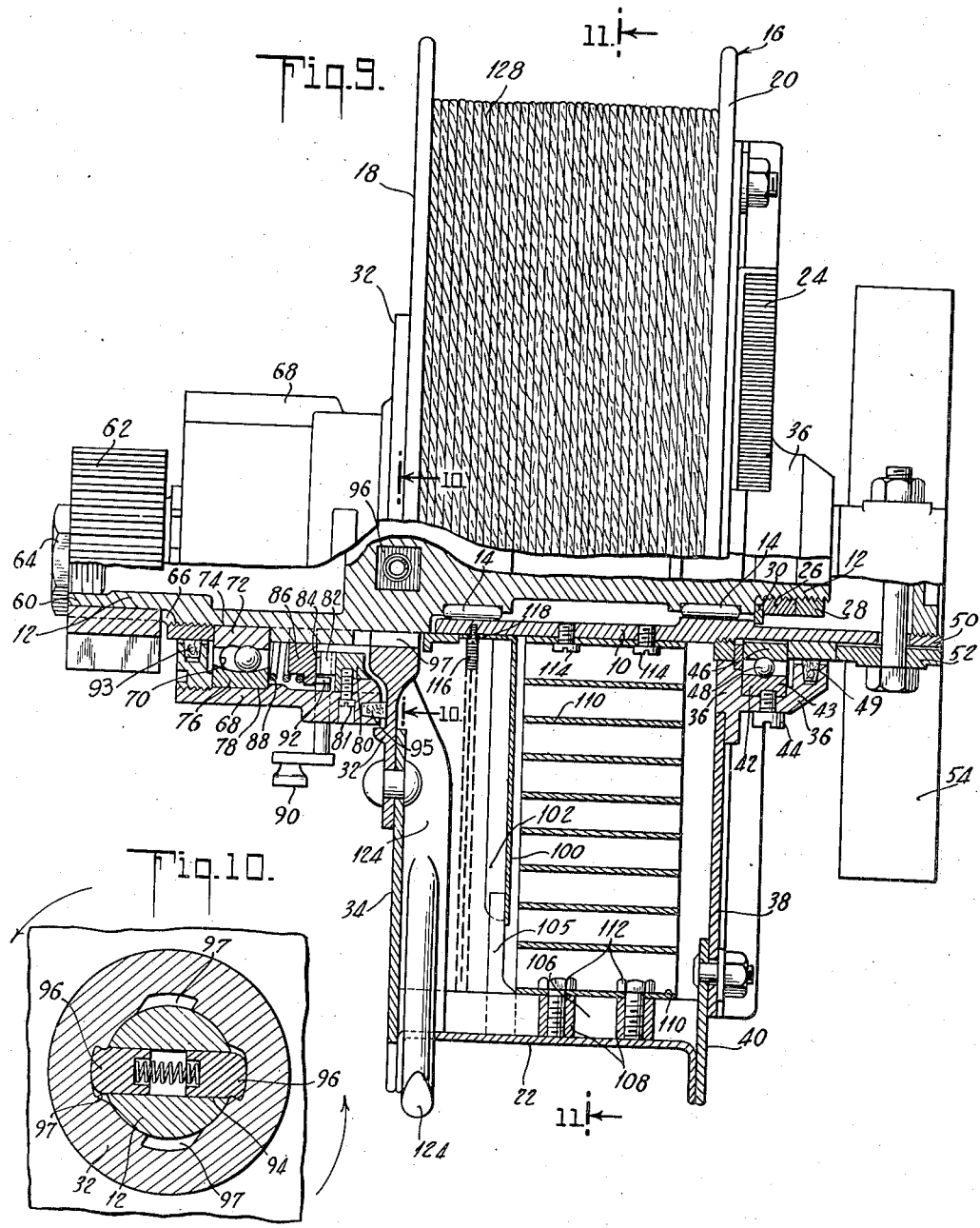

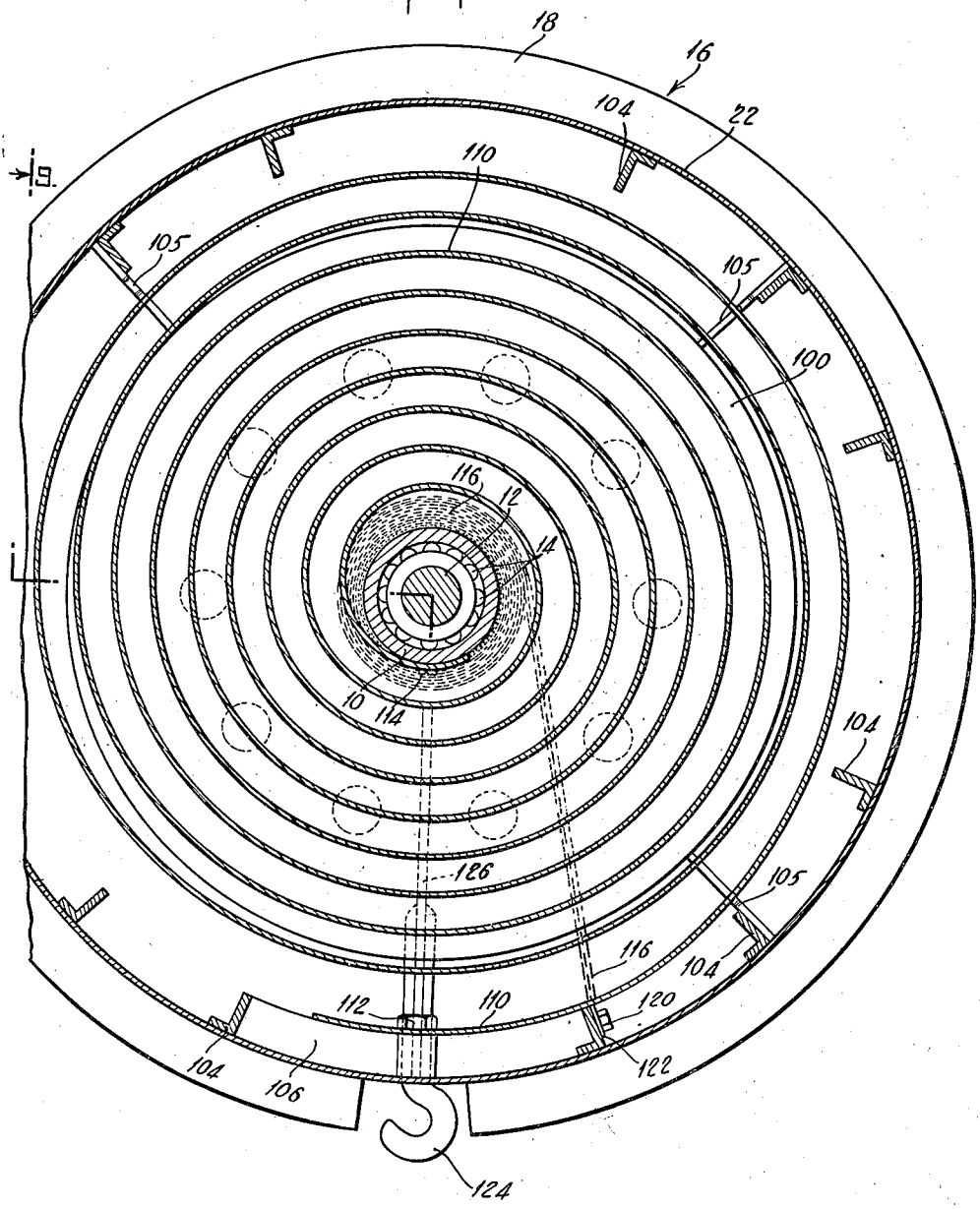

Patented Mar. 23, 1948

2,438,414

UNITED STATES PATENT OFFICE 2,438,414

TRACTION REDUCER

Jacques M. J. Riboud, Mount Washington, Md., assignor to Specialty Equipment and Machinery Corp., New York, N. Y., a corporation of Maryland Application March 1, 1944, Serial No. 524,834
In Canada March 22, 1943

3 Claims. (Cl. 280—3)

My invention relates generally to a device for moving heavy objects, and particularly wheel-mounted objects, over short distances by the exercise of relatively little power.

The main object of my invention is the provision of a device, which I shall refer to hereinafter as a "traction reducer," by which a relatively heavy object can be moved a relatively short distance by the expenditure of relatively little power.

Another object of my invention is the provision of a device which may be detachably secured to an object to be moved, whereby said object can be moved or drawn a short distance at a time, and the device easily and quickly adjusted to repeat the operation again and again, as often as desired.

Another object of my invention is the provision of a locking mechanism and a return mechanism for a traction reducer whereby, after the traction reducer has been operated to move an object for some distance, the object will be prevented from retrograde movement while the traction reducer is reset for reoperation to move the object a further distance.

Still another object of my invention is the provision of traction reducer which comprises a pair of telescoped shafts, one of which is fixed, and the other of which rotates with respect to the fixed shaft.

Still another object of my invention is the provision of a traction reducer which comprises a pair of telescoped shafts, one of which is fixed and the other of which rotates with respect to the fixed shaft, a drum mounted on said shafts, and connections between the drum and each of the shafts.

Still another object of my invention is the provision of a traction reducer which comprises a pair of telescoped shafts, one of which is fixed and the other of which rotates with respect thereto, a drum mounted on said shafts, a driving wheel, connections between the drum and each of the shafts, and a connection between the rotatable shafts and the driving wheel, whereby the shafts driving wheel may be locked against retrograde movement.

Still another object of my invention is the provision of a traction reducer which comprises a pair of shafts, a drum mounted on one of the shafts, the drum being rotatable and causing rotation of said shaft along with it, the other shaft being fixed, a connection between the drum and the fixed shaft, rotation of the drum in one direction tensioning the connection to cause rotation of the drum in the opposite direction.

Still another object of my invention is the provision of a traction reducer for a wheel-mounted object, the reducer comprising a pair of shafts partially telescoped one within the other, one of the shafts being secured to the wheeled object and fixed against rotation, and the other shaft being rotatable with respect to the fixed shaft, and having a driving engagement with a wheel of the object to be moved, said rotatable shaft having a drum mounted thereon, said drum being rotatable in both directions with the shaft in one direction and without the shaft in the other.

Still another object of my invention is the provision of a traction reducer which comprises a pair of telescoped shafts, one of which is fixed and the other of which is rotatable with respect thereto, a drum mounted on the rotatable shaft, and rotatable therewith, means to lock the shaft against movement in one direction, and means to lock the drum and shaft against movement in the same retrograde direction.

Other and further objects of my invention will be pointed out specifically hereinbelow, in connection with the following description of an illustrative embodiment, and still others will be readily apparent therefrom. My device is not to be limited except by the scope of the appended claims. Without limiting my invention thereto, I shall describe same as embodied in a device for moving a wheel-mounted object such as a gun carriage. Of course, in situations where motor-driven vehicles are available, as tractors or the like, there will be no need for my device, it being needed or useful only in situations where no motor-driven tractors are available or usable, such as limited areas where motor-driven moving means cannot operate efficiently.

In the drawings annexed hereto, and forming a part of this specification:

Figures 1, 2, 3, 4 and 5 are sketches showing my device attached to a wheeled gun mount, and various steps in the operation thereof;

Figs. 6 and 7 illustrate successive steps in the attachment of my device to a wheeled gun mount;

Fig. 8 is a side elevational view of a bracket device, whereby my device, also shown in side elevation, may be secured onto a wheeled vehicle, the shaft of which is shown in section;

Fig. 9 is a part elevational and part sectional view on the line 9—9 of Fig. 11, showing one form of device constructed according to and embodying my invention;

Fig. 10 is a section on the line 10—10 of Fig. 9, illustrating the return locking mechanism; and Fig. 11 is a vertical section through the drum component of my invention, on the line 11—11 of Fig. 9.

Referring to the drawings, and Figures 8 to 11 inclusive in particular, my device comprises a stationary shaft 10 and a rotating shaft 12, into which shaft 12 the stationary shaft is partially telescoped. Shaft 12 is annularly recessed to receive a plurality of needle bearings or cylindrical rollers 14, 14, to reduce friction between, and promote smoother rolling contact of, the telescoped portions of the shafts. As seen in Fig. 9, a suitable threaded nut, as 26, fitted onto shaft 12 may be employed to hold shafts 12 and 10 in proper alignment, and a jam nut 28 is used to maintain the alignment, a washer 30 bearing against aligned notches in both shafts determining the relative positioning of the shafts, as held by nuts 26, 28.

A large diameter circular hollow drum 16 is disposed about the shafts, the drum comprising a pair of built-up side flanges 18, 20 and a peripheral rim 22 of some width. Flanges 18, 20 of my drum may be provided with stiffening radial ribs as 24, 24, welded or otherwise secured thereonto. Drum 16 is mounted on shaft 12 for rotation therewith and relative thereto, as will be described in more detail below.

Both side flanges 18, 20 are comprised of several members secured together. Flange 18 comprises a disc or hub 32 disposed about the rotating shaft 12 but does not engage same, and a flat, annular, overlapping plate 34 bolted to hub 32 and welded or otherwise secured to rim 22. The other side of flange 20 comprises a disc or hub 36 and an annular plate 38 welded or otherwise secured to the outer margins of hub 36, and either to the rim 22 directly or to a narrower, intermediately disposed, annular overlapped plate 40, which may be secured to the rim directly.

A bearing-ball race 42 is secured within hub 36, the outer track 43 thereof being engaged and locked within the hub by a screw bolt 44 which passes through hub 36 and into track 43. The inner track 46 of the ball race 42 is screwed or otherwise secured to fixed shaft 10, the trapped balls 48 affording rolling friction between the drum hub and shaft 10. A packing ring 49 may be interposed between hub 36 and shaft 10 to keep foreign matter from entering and fouling ball-race 42.

The outer end 50 of shaft 10 is held against rotation within collar 52 of a bracket 54, which is of such construction that it may be keyed readily into a socket 56 clamped on shaft 58 of the object to be moved by my device. Socket 56 is no part of my invention as such, serving merely as a guiding and securing means for my device. The socket may be permanently secured for my device. The socket may be permanently secured to a shaft 58 of the object which may be moved with the aid of my traction reducing device.

The outer end 60 of movable shaft 12, at the opposite side of my device, has fitted thereonto a gear wheel 62, the diameter of which is considerably smaller than that of drum 16. A bolt cap 64 serves to keep gear 62 engaged onto shaft 12, and as seen at the extreme left-hand of Fig. 9, the outer end 60 of shaft 12 is splined, as at 66, to key gear 62 onto and rotate it along with shaft 12.

A housing 68 is provided, mounted about shaft 12 immediately adjacent hub 32 (see Fig. 9), having a bearing-ball race 70 therewithin, the inner track 72 of which is fixed onto and rotates along with shaft 12 as at 74. The outer track 76 is fixed inside the casing wall as at 78. A stationary sleeve 80 is locked to the underside of housing 68 by a headless set screw 81, the sleeve having angled radial teeth 82 therein, opposed and spaced from the angled radial teeth 84 on a sliding sleeve 86 mounted about shaft 12 and keyed thereinto for rotation therewith. Provision must be made, in attaching my traction reducer to an object to be moved thereby, to lock housing 68 thereto in fixed, non-rotative position. This is not shown on the drawings, but any particular attachment which locks housing 68 against rotation onto the device to be moved may serve. Teeth 82 and 84 are so angled that even when the sleeves are engaged, as shown in Fig. 9, shaft 12 may overside the clutched teeth in one direction, sliding sleeve 86 yielding against the tension of spring 88. The shaft cannot rotate in the reverse direction against the angularity of the interlocked teeth 82, 84.

Sliding sleeve 86 is disposed about shaft 12 and is normally urged into engagement with fixed sleeve 80 by a coil spring 88 trapped within housing 68 between ball-race 70 and sleeve 86. A knob 90-actuated cam 92 is provided whereby sliding sleeve 86 may be locked in disengaged relation to fixed sleeve 80. A pair of packing strips 93, 95 are disposed in housing 68, bearing against shaft 12 and hub 32 respectively, to prevent the entrance of foreign matter to foul the operation of cam 92 and ball-race 70.

A clutch 94 is provided within shaft 12, having spring pressed fingers 96 which are so biased against notches 97 in hub 32 as to lock shaft 12 together with the disc for rotation in the direction of the arrows, Fig. 10, and to permit disc 32 to rotate in the reverse direction when shaft 12 is locked against any movement.

Drum 16 is internally partitioned laterally thereof by an annular disc 100, having radial stiffening ribs 102 secured thereto. A plurality of angle iron stiffening ribs 104 are secured on the underside of drum rim 22, transversely disposed thereacross, and a number of metal strips or angles 105 are welded thereonto extending radially into the drum to bear against partition disc 100. A lateral flange 106 is welded inside the larger compartment within drum 16 to one of the transverse ribs 104, to which are secured a pair of transversely arranged cylindrical sleeves 108. One end of a wide spiral, flat torsion spring 110 is secured, by means to threaded screw bolts 112 passing through suitable openings in the spring into sleeves 108, and spring 110 spirals around inside the drum and its other end is secured to fixed shaft 10 by means of a pair of threaded screw bolts 114, 114. In Figs. 9 and 11, spring 110 is shown in expanded position within the drum.

Within the other and smaller compartment of drum 16, I provide another connection between the drum and fixed shaft 10. I dispose a flexible, non-expansible, chain 116 therewithin, one end of which is secured to shaft 10 by screw bolts 118, and the other end to the inside of rim 22, by screws 120, as at 122. Chain 116 is slightly shorter than spring 110, and it is so disposed within its compartment that it is wound about shafts 10, 12 when spring 110 is in the expanded position shown in Figs. 9 and 11.

A hook 124 of heavy metal is fixed to drum 16, welded to a stiffening rib 126 therewithin, and a cable 128 of steel wire or rope is provided, one end of which is engaged onto hook 124, and the body of which cable is wound about rim 22 of drum 16 when the device is in the ready-for-use position of Figs. 9 and 11. The other and free end 130 of cable 128 is to be grasped by the operators of my mechanism.

Referring now to Figs. 6 and 7, the shaft 58 of the wheeled object to be moved may have permanently secured thereto a locating arm or bracket 132 and a socket 56. Arm 132 is suitably apertured to permit gear 62 to pass therethrough and into operative engagement with a spur gear 134 secured to a wheel 136 of the object to be moved. In Fig. 6, my traction reducing device is shown supported by bracket 54 just before being keyed into the socket 56.

Gear 62 is lined up with the opening in arm 132 and the device is then slid inwardly, gear 62 engaging spur 134 and suitable means on arm 132 securing the housing 68 against rotation. The final operatively engaged position is shown in Fig. 7, with gear 62 in driving engagement with gear 134.

In Figs. 1 to 5 inclusive, my device is indicated by the letter T, and is shown as applied to a trail gun mount. It is desirable, of course, that the trail be lifted off the ground, and this can be done by another operator B. Free cable end 130 is grasped by operator A, who walks with it in the direction it is desired to move the gun mount. As the cable is pulled, drum 16 is rotated. For normal operation, the cam 92 is so positioned and locked that sliding sleeve 86 is disengaged from fixed sleeve 80, and the rotation of drum 16 carries shaft 12 and gear 62 keyed therewith around in the same direction, the engagement of gear 62 with spur 134 causing rotation of wheel 136 and forward movement of the object to be moved in the same direction as the operator is drawing the cable. As the drum is rotated counterclockwise, the flat spiral spring 110 is wound tightly about the shafts, and chain 116 is unwound from about the shafts. The purpose of chain 116 is to limit the extent of return rotation of drum 16 when the cable is released, or when the pulling tension is relaxed. Winding the spring closely about the shaft builds up tension in the spring to cause return rotation of the drum, and the chain limits the extent of this return rotation so that the spring does not entirely run down to below the point where it can exercise any tension. As chain 116 unwinds upon rotation of the drum, it is confined within its compartment on the other side of disc 100 from the compartment within which the spiral spring 110 is disposed. Cam 92 may be unlocked to permit engagement of sleeves 80, 86 during forward movement, but must be unlocked, and the sleeves engaged if it is desired to prevent any roll back or retrograde movement.

In Figure 1, operator A either grasps cable end 130, or dons a harness to which the cable end is secured. Operator B may support the gun trail above the ground. As operator A walks forward, in the direction of the arrow, cable 128 is unwound from drum 16 which is rotated counterclockwisely.

In Fig. 2, operator A has reached the limit permitted by the cable 128. The operator can continue to keep on pulling by direct traction, and there is no reduction at all. When it is desired to use the reduction again, the operator may follow one of two procedures. He may return to the gun carriage (see Fig. 3) and permit the tension of spring 110 to rewind cable 128 or drum rim 22, or he may stand in one position (see Fig. 4) alternately releasing and pulling cable 128 and thereby drawing the gun carriage towards his position. If it is desired to move the gun carriage in the other direction the traction reducer is removed and placed on the other wheel of the carriage (see Fig. 5).

My device effectively reduces the force necessary to move the gun carriage, the amount of reduction depending on the relative radii of drum 16, gear 62, spur 134 and wheel 136. The force which actually pulls the carriage is exerted partly on the base of the wheel and partly on the carriage. This is of substantial benefit when the ground is slippery and the friction which the wheel can develop is limited. As many men as desired may work on the cable, and they can exert maximum force with greater force than it is possible to exercise when conventional crank operated means are employed.

The permanent equipment on any object to fit it for movement by my traction reducer is simple, consisting merely of an arm as 132 to permit gear 62 to pass therethrough and to lock housing 68, a spur gear 134, and a locating and supporting socket 56. There are no alterations nor changes to be made in the gun carriage and my reducer may be installed and removed with no undue amount of time or difficulty. Two reducers are provided, one for each wheel of the carriage, and when it is desired to reverse direction, the reducers are merely switched from one wheel to the other.

Having described my invention, what I claim and desire to secure by Letters Patent is:

1. A device of the character described to be secured to a wheeled object, said device comprising a shaft, a drum mounted about the shaft, a driving wheel fixed to the shaft for rotation therewith, a direct connection between the driving wheel and a wheel of the wheeled object, rotation of the drum causing rotation of the shaft and of the driving wheel and rotation of the wheel of the wheeled object, the drum being hollow and having a spiral spring disposed therewithin to cause return rotation thereof, and a cable therewithin to limit the extent of such return rotation, rotation of the drum in one direction tightening the convolutions of the spiral spring and unwinding the cable from about the shaft, rotation of the drum in the reverse direction expanding the coils of the spring and rewinding the cable about the shaft.

2. A device of the character described to be secured to a wheeled object, said device comprising a shaft, a drum mounted about the shaft, a driving wheel fixed to the shaft for rotation therewith, a direct connection between the driving wheel and a wheel of the wheeled object, rotation of the drum causing rotation of the shaft and of the driving wheel and rotation of the wheel of the wheeled object, the drum being hollow and having spring means therewithin to cause return rotation of the drum, the drum having means independent of the spring to limit the extent of return rotation of the drum, said last named means functioning when the drum has substantially reached the limit of return movement.

3. A device of the character described to be secured to a wheeled object, said device comprising a shaft, a drum mounted about the shaft, a driving wheel fixed to the shaft for rotation therewith, a direct connection between the driving wheel and a wheel of the wheeled object, rotation of the drum causing rotation of the shaft and of the driving wheel and rotation of the wheel of the wheeled object, the drum being hollow and having means therewithin to cause return rotation of the drum, and having means consisting of a cable of substantially inexpansible material independent of the means causing return rotation of the drum, to limit the extent of the return rotation.

JACQUES M. J. RIBOUD.

REFERENCES CITED

The following references are of record in the file of this patent:

UNITED STATES PATENTS

| Number | Name | Date |
|---|---|---|
| 261,051 | Scott | July 11, 1882 |
| 261,568 | Snow | July 25, 1882 |
| 1,300,232 | Skandora | Apr. 8, 1919 |
| 1,503,009 | Savage | July 29, 1924 |
| 1,711,037 | Bojer | Apr. 30, 1929 |
| 1,798,971 | Clements | Mar. 31, 1931 |
| 1,875,096 | Miller | Aug. 30, 1932 |
| 2,012,683 | Johnson | Aug. 27, 1935 |
| 2,049,345 | Young | July 28, 1936 |

FOREIGN PATENTS

| Number | Country | Date |
|---|---|---|
| 10,998 | Great Britain | May 3, 1897 |
| 14,042 | Great Britain | Sept. 29, 1888 |
| 16,156 | Great Britain | Dec. 9, 1882 |
| 97,972 | Austria | Sept 25, 1924 |